Sept. 4, 1956          A. CHERKIN          2,761,445

APPARATUS FOR REGULATING FLUID FLOW

Filed May 3, 1952          2 Sheets-Sheet 1

INVENTOR.
ARTHUR CHERKIN
BY
Lyon & Lyon
ATTORNEYS

Sept. 4, 1956 A. CHERKIN 2,761,445
APPARATUS FOR REGULATING FLUID FLOW
Filed May 3, 1952 2 Sheets-Sheet 2

INVENTOR.
ARTHUR CHERKIN
BY
*Lyon & Lyon*
ATTORNEYS

United States Patent Office 2,761,445
Patented Sept. 4, 1956

2,761,445

APPARATUS FOR REGULATING FLUID FLOW

Arthur Cherkin, Los Angeles, Calif., assignor to Don Baxter, Inc., Glendale, Calif., a corporation of Nevada Application May 3, 1952, Serial No. 285,931

10 Claims. (Cl. 128—214)

This invention relates to an apparatus for regulating the flow of fluid from a container, and refers particularly to an apparatus for use in the administration of parenteral solutions.

The present technique for administering parenteral solutions is to position a container of the solution on a standard at a suitable elevation above the patient and to pass the solution from the container, under gravity, through a drip chamber and hypodermic needle into the patient. A screw clamp is applied to the tubing to regulate the rate of flow. It is well known that such means of regulating flow are not absolute and after a clamp is set for a given rate of flow the flow may vary during administration. A nurse or attendant must be present to regulate the flow and shut off the flow when the required volume has been administered.

It is a general object of the present invention to provide a device adapted for handling parenteral solutions which are to be administered to a patient through a needle, which device is capable of regulating the rate of flow, and also capable of shutting off automatically when a predetermined volume has been administered.

Another object of the present invention is to provide a device for so administering parenteral solutions which will cut off automatically the rate of flow of solution to the patient whenever, for any reason, the resistance to the flow of solution exceeds a predetermined value.

The present invention provides an apparatus for administering parenteral solutions which dispenses with the necessity of using standards to suspend a container of solution, dispenses with the necessity of the usual drip indicator and clamps, and also avoids the necessity of careful watching by a nurse or attendant during the administration of parenteral solutions.

The present invention includes not only apparatus capable of being driven by electrical means, but also includes a form of apparatus which is entirely powered by spring motor, thus being useful under field conditions where no source of energy, such as electrical mains, are available.

The device of the present invention, together with various further advantages of the invention will be more fully understood from the following description of the preferred examples of the invention, the description being given in connection with the accompanying drawings, in which.

Figure 1:
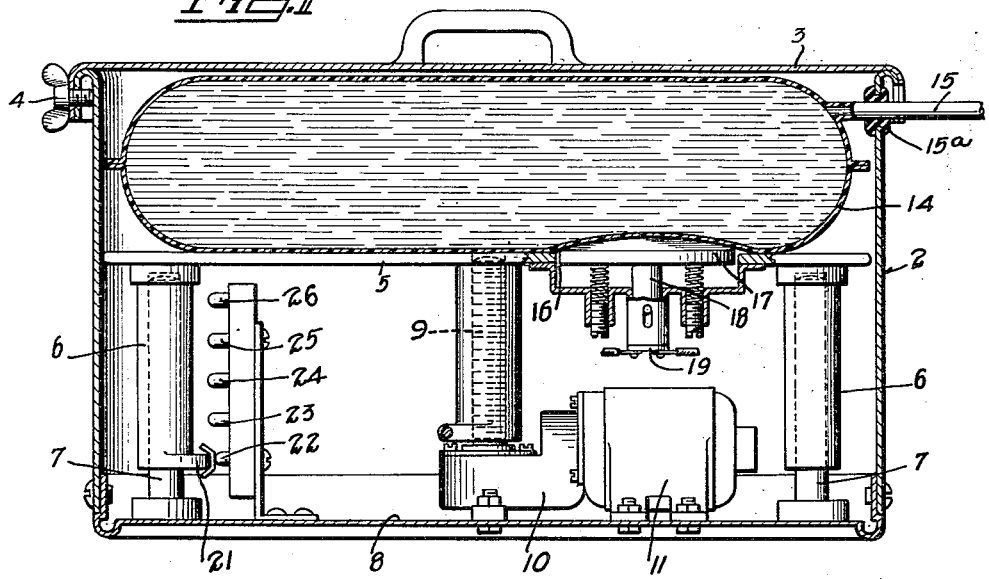
Figure 1 is an elevation partially in section of an apparatus embodying the invention.
Figure 2:
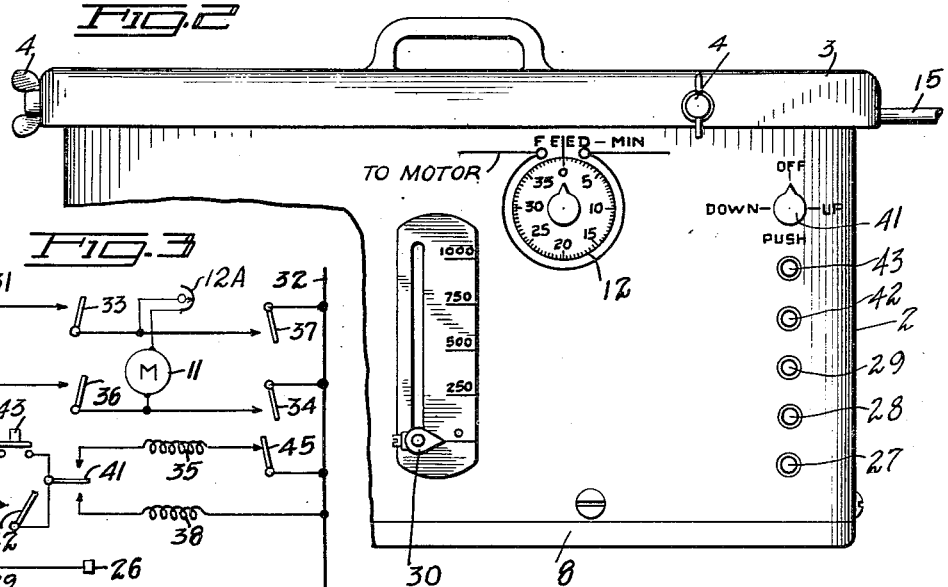
Figure 2 is an elevation.
Figure 3:
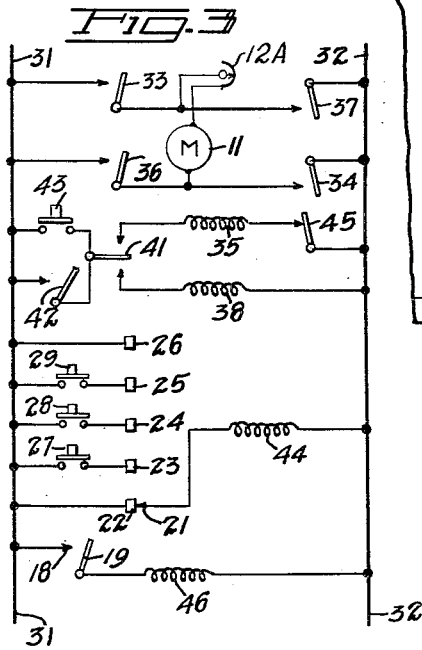
Fig. 3 is an electrical diagram of the apparatus of Figures 1 and 2.

Referring to the drawings, Figures 1 to 3 inclusive, the device of the present invention includes a case 2, which has a detachable cover 3. The cover 3 as indicated is held in place by wing bolts 4. Within the case 2 there is provided a platform 5, which platform is guided so as to move in a vertical direction on sleeves 6, which slide over the rods 7, which extend upwardly from the base 8 of the case. The platform is driven upwardly by a feed-screw 9, which in turn is driven from a worm-wheel (not shown) which is part of a reduction gearing 10 attached to the electric motor 11. Preferably there is employed a variable speed electric motor, the speed of which may be regulated by rheostat 12a operated by a dial, such as indicated at 12.

In practice the parenteral solutions are contained within a flexible plastic bag 14, which is placed upon the platform 5. A tubing 15 of rubber or plastic connects with the bag 14, and extends through a grommet 15a in the case, and thence leads to a hypodermic needle (not shown) by means of which the solution is to be administered to a patient. The bag 14 is of such size that when filled with solution and with the platform in the lower position, the top of the bag just contacts the cover 3. When the platform is moved upwardly the bag 14 is squeezed between the cover 3 and the platform 5 causing the fluid to be forced from the bag 14, through the tubing 15 at a regulated rate, which rate depends upon the speed of upward movement of the platform, which in turn is regulated by the speed of the motor as set by the dial 12.

Means are also provided by which the flow of fluid and the upward movement of the platform 5 will be automatically stopped whenever the resistance or back pressure offered to the flow of fluid through the tubing 15 rises above a predetermined value. Means of this type are of importance in the administration of parenteral solutions and offers a protection against damaging the patient in event the hypodermic needle slips from position.

As indicated in the drawings the platform 5 is provided with a recess 16 through which rises the spring-pressed pad 17. The pad 17 carries an electric contact 18, which is adapted to engage a contact 19 if the pad is forced downwardly against the spring. In operation the pad 17 is in engagement with the walls of the flexible bag 14 and the pressure of solution in the bag is in turn imposed on the pad 17 forcing that pad downward against the action of the spring. Whenever the pressure against bag 14 rises to a certain critical value contacts 18 and 19 are closed and, as hereafter pointed out, the electric motor 11 is automatically stopped.

This means for automatically cutting off the flow of fluid from the bag 14 is all independent of making any physical attachment with the bag so that all the operator is required to do is take a bag of parenteral solution, place the same in the apparatus, and allow this apparatus to operate.

Means are also provided by which the apparatus will be shut off automatically when any predetermined set volume of solution has been delivered. In the particular machine illustrated provision was made for shutting off the apparatus on delivery of 250, 500 and 750 cc. of solution. For this purpose the sleeve 6 is indicated as provided with a contact 21 which contact, as shown in Figure 1, is adapted to move in successive engagement with the vertical series of stationary contacts 22, 23, 24, 25 and 26 (Figures 1 and 3). There is also provided an indicator 30 which moves over a dial graduated in volumes, which indicates the volume of fluid which will be discharged on the movement of the platform into position to engage the successive contacts 22, 23, 24, 25 and 26. In series with the contacts 23, 24 and 25 are the manually closable switches 27, 28 and 29 respectively. Accordingly when the platform is driven upwardly, if all of the manually operated switches 27, 28 and 29 are open, contact 21 will move upwardly until it engages contact 26.

Now referring to Figure 3 of the drawings, 31 and 32 are electrical mains; 33 and 34 are contacts which are normally open but are adapted to be simultaneously closed on the energization of the coil 35 of a relay, whereas 36 and 37 are contacts which are normally open but are adapted to be simultaneously closed by the energization of a coil 38 of a relay. Thus when coil 35 is energized the motor 11 is connected across the mains in one direction (to cause the platform to rise) and when coil 38 is energized the motor 11 is connected across the mains in the opposite direction to cause the platform to descend. The direction of movement of the motor is thus controlled by the position of the switch 41. The switch 41 is connected to the main 31 through the normally closed contact 42. This contact, while normally closed, is opened by energization of the relay 44, which is connected with the contact 21 and therefore the contact 42 is open whenever the platform is at the starting position and whenever the platform reaches either the top or any position where one of the switches 27, 28 or 29 are closed. To start the motor with the platform in such position there is provided a starting button 43.

Thus in normal operation when the platform 5 is at the bottom contact 42 is open and switch 41 is moved to make proper contact with the up position and the starting button 43 is pressed. Contact 42 closes as soon as the platform starts moving and holds the motor running until coil 44 is again energized. Accordingly the platform travels upwardly either to the top or to some position where one of the manual switches 27, 28 or 29 has been closed.

In series with the relay 35 which is energized in the upward direction is a normally closed contact 45. This contact is adapted to be opened whenever the relay 46 is energized. This relay is energized by closing of contacts 18 and 19 by movement of the pressure-responsive pad 17. It is the opening of this contact 45 therefore which provides the means for automatically stopping the motor 11 when the pressure within the bag 14 exceeds a desired value.

With this form of apparatus it will be seen that merely by setting the switch 41 in up position (with the platform at the bottom) and pressing the starting button 43 the apparatus can be caused to automatically deliver any desired predetermined quantity of solution, the quantity to be determined by the position of manual switches 27, 28, 29. When the resistance to the flow of solution from the plastic container rises above a predetermined value the motion of the platform upwardly will be automatically stopped. Furthermore, this apparatus is all operable with the control of the fluid flow without connections having to be made with the containers of the fluid—it merely being necessary to set a sterile container in the apparatus and start the apparatus operating. The apparatus may be at a lower level than the patient to which the solution is to be administered, the administration of the solution not being controlled by gravity.

Figure 4:
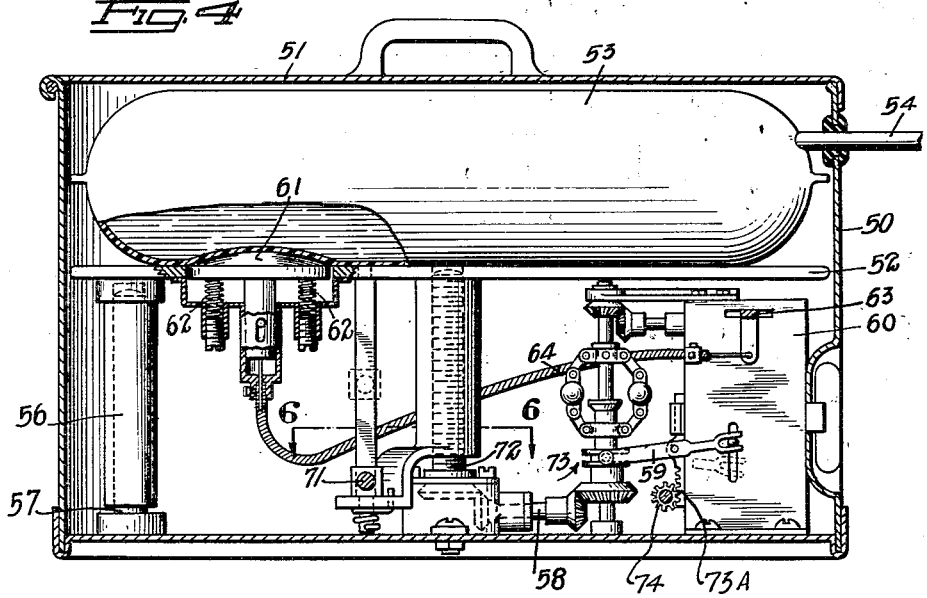
Figure 4 is an elevation of a modified form of the invention utilizing the spring motor.
Figure 5:
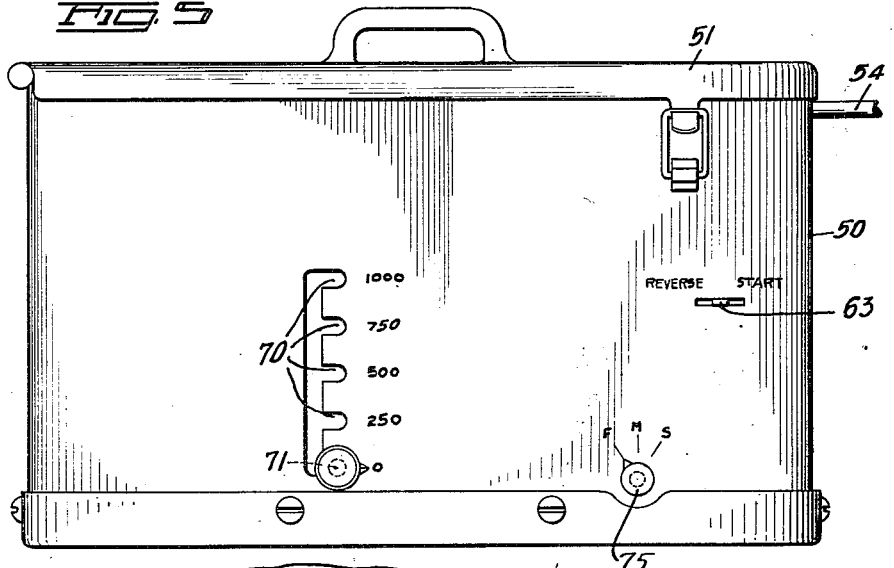
Figure 5 is an elevation.
Figure 6:
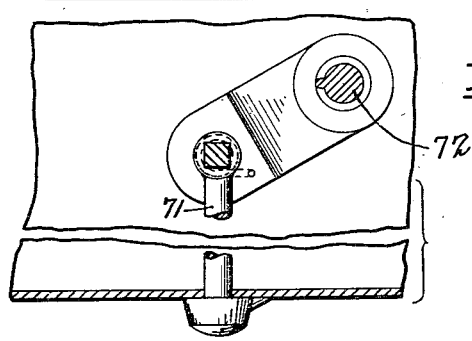
Figure 6 is a fragmentary section on the line 6—6 of Figure 4.

Now referring to Figures 4, 5 and 6 of the drawings, I have shown a modification of the invention which is intended to be driven by a spring motor so as to provide an apparatus which can be employed independently of an electric power main. In the drawings there is provided a case 50 having a cover 51 and a platform 52. The platform 52 is intended to move upwardly to cause the flow of fluid from the bag 53 which, in practice, is connected to the tubing 54 leading to a hypodermic needle. The platform is provided with the sleeves 56 which slide over the upstanding rods 57 to guide the platform in its vertical movements. The motion of the platform is obtained by a feed screw 72 driven by a shaft 58 connected to the clutch 73 to a spring motor 60.

In order to provide for an automatic stop of the apparatus when the pressure in the bag 53 rises to a predetermined value there is provided the spring-pressed pad 61, which normally stands somewhat above the level of the platform 52 and is movable downwardly to a recess in that platform against the pressure of springs 62. In so moving downward the position is reached in which rod 63 maneuvers to stop the spring motor 60. The rod 63 is movable to the right to start the motor forwardly and to the left, as viewed in Figure 4, to start in the reverse direction. In the center position the motor is stopped. Various means may be provided for interconnecting rod 63 with the pad 61 so as to move the rod 63 to the neutral position and permit that rod to be turned to the stopping position. The spring motor is shown as provided with a governor 64 which operates through the arm 59 to regulate the speed of the motor. The arm 59 is shown pivoted to a vertically slidable rack 73A which is movable upward and downward by a gear 74 which is rotatable by the knob 75, which is shown movable over the F—M—S scale on the exterior of the casing 50.

The apparatus thus described provides a spring controlled apparatus which likewise may be utilized to automatically regulate the flow of parenteral solutions to patients.

The platform in both forms of this invention is driven upwardly at a constant rate of speed for any one setting of either the electric motor or the spring motor. This naturally follows as the speed of the electric motor is set by the rheostat 12a and the spring motor by the governor 64, as both motors have a direct drive to the platform.

While the particular forms of the apparatus herein described are well adapted for carrying out the objects of the present invention, various modifications and changes may be made and this invention is of the scope set forth in the appended claims.

I claim:

1. An apparatus for administering parenteral solutions which comprises a casing providing a chamber for receiving a flexible bag of parenteral solution to be administered, a movable platform in position for contacting said bag within the casing and applying pressure to the bag to eject the contents thereof, a motor for driving said platform, driving means between said motor and said platform whereby the contents of said bag will be discharged at a uniform rate during a single movement of said platform.

2. An apparatus for administering parenteral solutions which comprises, a casing providing a chamber for receiving a flexible bag of parenteral solution to be administered, a movable platform in position for contacting said bag within the casing and applying pressure to the bag to eject the contents thereof, a motor for so moving said platform and means between said motor and said platform, including a feed screw driven by said motor whereby the platform is driven at a constant speed during a single operation thereof.

3. An apparatus for administering parenteral solutions which comprises, a casing providing a chamber for receiving a flexible bag of parenteral solution to be administered, a movable platform in position for contacting said bag within the casing and applying pressure to the bag to eject the contents thereof, a motor for driving said platform, means between said motor and said platform whereby the platform is driven at a constant speed in a single motion thereof.

4. An apparatus for administering parenteral solutions which comprises, a casing providing a chamber for receiving a flexible bag of parenteral solution to be administered, a movable platform in position for contacting said bag within the casing and applying pressure to the bag to eject the contents thereof, a motor for driving said platform whereby said platform is driven at a constant speed in a single operation and means for stopping said motor at a plurality of predetermined selected positions of said platform.

5. An apparatus for administering parenteral solutions which comprises, a casing providing a chamber for receiving a flexible bag of parenteral solution to be administered, a movable platform in position for contacting said bag within the casing and applying pressure to the bag to eject the contents thereof, a motor for driving said platform, said motor comprising an electrically driven motor, and means between said motor and platform whereby said platform may move at a constant speed during a single motion thereof when driven by said motor.

6. An apparatus for administering parenteral solutions which comprises, a casing providing a chamber for receiving a flexible bag of parenteral solution to be administered, a movable platform in position for contacting said bag within said casing and applying pressure to the bag to eject the contents thereof, a motor for driving said platform, said motor comprising a spring motor, and means connecting said motor and said platform whereby said platform moves upwardly at a constant speed when driven by said motor.

7. An apparatus for delivering parenteral solutions at a constant predetermined value which comprises, a casing having a chamber therein for receiving a flexible bag of parenteral solution and having an outlet for a tube from said bag, a platform within said casing in position for contacting said bag, means for moving said platform and compressing fluid within said bag and ejecting the same through the outlet, said means including a feed screw attached to said platform and a driven gear for moving said feed screw and a motor for driving said gear whereby said platform moves upwardly at a constant speed in a single motion thereof when driven by said motor, and means for automatically stopping the motor on the development of a predetermined pressure within said bag.

8. An apparatus for delivering parenteral solutions at a constant predetermined value which comprises, a casing having a chamber therein for receiving a flexible bag of parenteral solution and having an outlet for a tube from said bag, a platform within said casing in position for contacting said bag, means for moving said platform and compressing fluid within said bag and ejecting the same through the outlet, said means comprising a constant speed motor, and drive means between said motor and platform whereby the platform moves upwardly at a constant speed when driven upward by said motor, means for automatically stopping the motor on the development of a predetermined pressure within said bag, and means for automatically stopping the motor on the motion of said platform to one of a plurality of selectable positions.

9. An apparatus for administering solutions which comprises, a casing having a chamber for receiving a flexible bag of solution to be administered and having an opening for an outlet tube from said bag, a movable platform in said casing in position for contacting said bag within the casing and applying pressure to the bag on movement to eject the contents thereof, means for driving such platform upwardly at a constant rate of speed so that when driven the solution will be ejected from said bag at a uniform rate, and means responsive to the resulting pressure in said bag and effective for stopping the upward movement of said platform on the development of the predetermined pressure within said flexible bag.

10. An apparatus for administering solutions which comprises, a casing having a chamber for receiving a flexible bag of solution to be administered and having an opening for an outlet tube from said bag, a movable platform in said casing in position for contacting said bag within the casing and applying pressure to the bag on movement to eject the contents thereof, means for driving such platform upwardly at a constant rate of speed so that when driven the solution will be ejected from said bag at a uniform rate, means responsive to the resulting pressure in said bag and effective for stopping the upward movement of said platform on the development of the predetermined pressure within said flexible bag, the means for driving said bag including a springwound motor having a regulator for maintaining the speed thereof constant, and a driving connection between said motor and platform to permit said platform to move at a constant speed upwardly on the constant speed operation of said motor.

References Cited in the file of this patent

UNITED STATES PATENTS

| Number | Name | Date |
|---|---|---|
| 103,640 | Merritt | May 31, 1870 |
| 334,571 | De Logerot | Jan. 19, 1886 |
| 1,922,941 | Francis et al. | Aug. 15, 1933 |
| 1,988,624 | Kipp | Jan. 22, 1935 |
| 2,074,223 | Horiuchi | Mar. 16, 1937 |
| 2,409,734 | Bucher | Oct. 22, 1946 |
| 2,533,839 | Robinson | Dec. 12, 1950 |
| 2,602,446 | Glass et al. | July 8, 1952 |